United States Patent
Gramiccioni et al.

(10) Patent No.: US 8,835,346 B2
(45) Date of Patent: *Sep. 16, 2014

(54) CATALYST MATERIALS

(75) Inventors: Gary A. Gramiccioni, Madison, AL (US); Stephan Siemund, Pattensen (DE); Shau-Lin F. Chen, Shanghai (CN); Kenneth Brown, Athens, AL (US)

(73) Assignee: BASF Corporation, Florham Park, NJ (US)

( * ) Notice: Subject to any disclaimer, the term of this patent is extended or adjusted under 35 U.S.C. 154(b) by 82 days.

This patent is subject to a terminal disclaimer.

(21) Appl. No.: 13/560,096

(22) Filed: Jul. 27, 2012

(65) Prior Publication Data

US 2014/0031197 A1 Jan. 30, 2014

(51) Int. Cl.
| | |
|---|---|
| *B01J 8/02* | (2006.01) |
| *B01J 21/04* | (2006.01) |
| *B01J 23/00* | (2006.01) |
| *B01J 23/02* | (2006.01) |
| *B01J 23/06* | (2006.01) |
| *B01J 23/58* | (2006.01) |
| *B01D 53/56* | (2006.01) |
| *B01D 53/94* | (2006.01) |
| *C01B 21/00* | (2006.01) |
| *C01B 23/00* | (2006.01) |
| *C01B 25/00* | (2006.01) |
| *C01B 31/00* | (2006.01) |
| *C01B 33/00* | (2006.01) |
| *C01B 35/00* | (2006.01) |
| *C01G 28/00* | (2006.01) |
| *C01G 30/00* | (2006.01) |

(52) U.S. Cl.
USPC ........... 502/217; 502/302; 502/325; 502/328; 502/340; 502/349; 423/213.2; 423/213.5

(58) Field of Classification Search
USPC ................. 502/217, 302, 325, 328, 340, 439; 423/213.2, 213.5
See application file for complete search history.

(56) References Cited

U.S. PATENT DOCUMENTS

| | | | |
|---|---|---|---|
| 3,819,535 A | 6/1974 | Huba et al. | |
| 3,867,312 A | 2/1975 | Stephens | |
| 4,171,288 A | 10/1979 | Keith et al. | |
| 5,316,738 A | 5/1994 | Kojima et al. | |
| 5,814,285 A | 9/1998 | Kojima et al. | |
| 5,883,037 A | 3/1999 | Chopin et al. | |
| 7,348,289 B2 | 3/2008 | Ichikawa et al. | |
| 7,422,731 B2 * | 9/2008 | Nakatsuji et al. | 423/239.1 |
| 7,473,665 B2 | 1/2009 | Kawai et al. | |
| 7,585,477 B2 * | 9/2009 | Nakatsuji et al. | 423/213.2 |
| 7,749,472 B2 | 7/2010 | Chen et al. | |
| 8,455,390 B2 * | 6/2013 | Kikuchi et al. | 502/300 |
| 8,545,780 B1 * | 10/2013 | Chen et al. | 423/213.2 |
| 2004/0266615 A1 | 12/2004 | Watson et al. | |
| 2005/0265920 A1 | 12/2005 | Ercan et al. | |
| 2007/0219089 A1 | 9/2007 | Goto | |
| 2008/0038172 A1 | 2/2008 | Chen et al. | |
| 2010/0189615 A1 | 7/2010 | Gramiccioni | |
| 2012/0165185 A1 | 6/2012 | Gramiccioni et al. | |

OTHER PUBLICATIONS

Non-Final Office Action in U.S. Appl. No. 13/560,112, mailed Feb. 26, 2013, 11 pgs.
International Search Report for PCT counterpart PCT/US2013/051847 of this case (Korean Intellectual Property Office mailed Oct. 22, 2013).

* cited by examiner

*Primary Examiner* — Patricia L Hailey
(74) *Attorney, Agent, or Firm* — Melanie L. Brown

(57) ABSTRACT

A catalyst material including a catalyst carrier including a porous alumina support and a hindrance layer on the alumina support, the hindrance layer comprising one or more barium sulfate, strontium sulfate, zirconium sulfate, and calcium sulfate is described. The catalyst carrier further includes a rare earth oxide. The catalyst material can further comprise a platinum group metal oxide. The hindrance layer may prevent the rare earth oxide from forming a complex with the support. The catalyst material is useful for methods and systems of abating pollutants from automotive exhaust gas.

15 Claims, No Drawings

CATALYST MATERIALS

TECHNICAL FIELD

The present invention relates to catalyst materials comprising catalyst carriers useful for supporting an exhaust gas purification catalyst. The catalysts can be used for reducing the levels of hydrocarbon, carbon monoxide, and/or nitrogen oxides present in the exhaust gas stream.

BACKGROUND

High temperature catalysts, e.g. three-way catalysts (TWC), have utility in a number of fields including the abatement of nitrogen oxide (NOx), carbon monoxide (CO) and hydrocarbon (HC), such as non-methane hydrocarbon (NMHC), pollutants from gasoline-fueled internal combustion engines, such as automobile and other gasoline-fueled engines. Emission standards for unburned hydrocarbons, carbon monoxide, and nitrogen oxide contaminants have been set by various governments and must be met, for example, by new automobiles. To meet such standards, catalytic converters containing a TWC are located in the exhaust gas line of gasoline-fueled internal combustion engines. Three-way conversion catalysts are polyfunctional because they have the ability to substantially and simultaneously catalyze the oxidation of hydrocarbons and carbon monoxide and the reduction of nitrogen oxides.

A TWC exhibiting good activity and long life comprise one or more platinum group metals (PGM), e.g., platinum, palladium, rhodium, ruthenium, osmium, and iridium. These catalysts are combined with a high surface area refractory oxide carrier. The refractory metal oxide can be derived from aluminum, titanium, silicon, zirconium and cerium compounds, resulting in the oxides with the exemplary refractory oxides including at least one of alumina, titania, silica, zirconia and ceria. Generally, the TWC are carried by gamma-alumina.

The TWC is deposited on a suitable substrate such as a monolithic material comprising a refractory ceramic or metal honeycomb structure, or refractory pellets such as spheres, beads or short, extruded segments of a suitable refractory material.

High surface area refractory metal oxides are often employed as a carrier for many of the catalytic components. For example, high surface area alumina materials, also referred to as "gamma alumina" or "activated alumina," used with TWC catalysts typically exhibit a BET surface area in excess of 60 $m^2/g$, and often up to about 200 $m^2/g$ or more. Such activated alumina is usually a mixture of the gamma and delta phases of alumina, but may also contain substantial amounts of eta, kappa, and theta alumina phases. Refractory metal oxides other than activated alumina may be utilized as a carrier for at least some of the catalytic components in a given catalyst. For example, bulk ceria, zirconia, alpha-alumina and other materials are known for such use. Although many of these materials have a lower BET surface area than activated alumina, that disadvantage tends to be offset by the greater durability of the resulting catalyst.

Exhaust gas temperatures can reach 1000° C. or higher in a moving vehicle, and such elevated temperatures can cause activated alumina, or other carrier materials, to undergo thermal degradation caused by a phase transition with accompanying volume shrinkage especially in the presence of steam. During this degradation, the catalytic metal becomes sintered in the shrunken support medium with a loss of exposed catalyst surface area and a corresponding decrease in catalytic activity.

To prevent sintering of catalytic metals, alumina carriers are often doped with a stabilizing material. The stabilization of TWC catalyst carriers are known in the art. For example, U.S. Pat. No. 4,171,288 discloses a method to stabilize alumina carriers against such thermal degradation by the use of materials such as zirconia, titania, alkaline earth metal oxides such as baria, calcia, or strontia, or rare earth metal oxides such as ceria, lanthana, and mixtures of two or more rare earth metal oxides.

In a three-way catalytic converter, the air/fuel ratio (A/F) needs to be maintained within a narrow range to achieve high conversion efficiency for CO, HC, and NOx simultaneously. However, since a typical gasoline engine runs with the A/F oscillating in a certain range, an oxygen storage component is needed to counteract the effect of oscillating gas compositions in the exhaust by taking up oxygen during "lean burn" (high A/F) and releasing oxygen during "rich burn" (low A/F). Oxygen storage materials can store or release oxygen depending on the conditions that the materials are in. With current TWC, the addition of auxiliary catalyst material having oxygen storage capacity (OSC) mitigates A/F variation and adjusts the atmosphere at the surface of the catalyst, thereby controlling NOx discharge. Rare earth oxides, ceria more particularly, are commonly used as the primary component of oxygen storage materials.

It would be desirable to provide improved catalyst materials including carriers for PGM catalysts that exhibit good stability at high temperatures.

SUMMARY

Embodiments of the present invention are directed to catalyst materials including catalyst carriers. The catalyst materials according to one or more embodiments can be used in the abatement of pollutants from automotive exhaust gas. The catalyst carriers according to a first aspect of the present invention include a porous alumina support and a hindrance layer comprising one or more of barium sulfate, strontium sulfate, zirconium sulfate, and calcium sulfate. In specific embodiments, the hindrance layer does not include zirconium sulfate. Palladium oxide is disposed on the catalyst carrier. In an embodiment, the catalyst carrier further includes a rare earth oxide to stabilize the palladium oxide and slow decomposition of palladium oxide into palladium metal and to stabilize the platinum group metal against sintering. The hindrance layer is effective to prevent the rare earth oxide from forming a complex with the alumina support. The palladium oxide can be fixed either to the hindrance layer or to the rare earth oxide. In one or more embodiments, the palladium oxide may be chemically and/or thermally fixed to the hindrance layer or the rare earth oxide. Thermally fixing can be achieved by calcination at temperatures of 200° C. or higher, for example 300° C., 400° C., 500° C. or higher. The palladium oxide can be placed in close proximity to the rare earth oxide.

The rare earth oxide can comprise at least one oxide of a rare earth metal selected from Ce, Pr, Nd, Eu, Sm, Yb, and La, and mixtures thereof. In one or more embodiments, the rare earth oxide is selected from an oxide of Ce, Pr, La and mixtures thereof.

In an embodiment, the catalyst carriers include a rare earth oxide comprising at least one oxide of neodymium and lanthanum complexed with one or more of nickel, iron, manganese, copper, and aluminum in a perovskite phase.

The catalyst material may also comprise an additional oxygen storage component in particulate form. The additional oxygen storage component may comprise ceria. The oxygen storage component may further comprise at least one oxide selected from zirconium, yttrium, lanthanum, praseodymium, neodymium, europium, samarium, ytterbium and mixtures thereof. In some embodiments, cerium oxide may be complexed with a mixture of neodymium praseodymium, and zirconium.

In one or more embodiments, a catalyst material comprises a carrier including a support including barium sulfate ($BaSO_4$) and alumina and having a platinum group metal oxide thermally or chemically fixed to the support. In an embodiment, the catalyst carrier further includes a rare earth oxide that changes valence state to stabilize platinum group metal oxide and slow decomposition of platinum group metal oxide into a platinum group metal and to stabilize the platinum group metal against sintering. The platinum group metal oxide is effective to prevent the rare earth oxide from forming a complex with the alumina support. In some embodiments, the platinum group metal is palladium.

The rare earth oxide can comprise at least one oxide of a rare earth metal selected from Ce, Pr, Nd, Eu, Sm, Yb, and La, and mixtures thereof. In one or more embodiments, the rare earth oxide is selected from an oxide of Ce, Pr, La and mixtures thereof.

In an embodiment, the catalyst carriers include a rare earth oxide comprising at least one oxide of neodymium and lanthanum complexed with one or more of nickel, iron, manganese, copper, and aluminum in a perovskite phase. In some embodiments, the rare earth oxide comprises an oxide of lanthanum complexed with manganese.

A second aspect of the present invention is directed to a catalytic article for treating exhaust gas emissions. The catalytic article according to one embodiment comprises the platinum group metal catalyst carrier of the present invention disposed on a ceramic or metallic honeycomb flow-through substrate.

A third aspect of the present invention is directed to a method of treating a gaseous exhaust stream of a gasoline engine, the exhaust stream including hydrocarbons, carbon monoxide, nitrogen oxide, and other gas components. The method according to one embodiment comprises contacting the exhaust stream with a catalytic material comprising the platinum group metal catalyst carrier of the present invention disposed on a ceramic or metallic honeycomb flow-through substrate.

DETAILED DESCRIPTION

Before describing several exemplary embodiments of the invention, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as disclosed.

In high temperature catalysts, for example in three-way catalysts, chemical reactions that reduce automotive emissions occur on the surface of platinum group metal (PGM) particles. Cerium oxides and platinum group metals (PGMs) present in a TWC are subject to mutual interaction. In particular, cerium oxide can enhance the catalytic activity of the PGM or stabilize the PGM. At high temperatures (800-1100° C.), however, it has been observed that ceria and the alumina support form a stable complex. This ceria-alumina complex reduces the amount of ceria available to beneficially interact with the PGM, thus decreasing catalytic activity. There is a need, therefore, for a platinum group metal catalyst carrier that limits the interaction of ceria and alumina and promotes catalytic activity.

With respect to the terms used in this disclosure, the following definitions are provided.

As used herein, "complex" refers to the combination of two more chemical elements, such that the chemical elements interact by one or more of a covalent bond, ionic bond, metallic bond, or some other chemical attraction. In some cases, the complex may result in the formation of compound comprised of at least two different chemical elements.

As used herein, the term "layer" refers to a structure that is supported on a surface. A "layer" forms a barrier by primarily covering the reactive surface of the alumina support.

As used herein, the term "hindrance layer" refers to a protective layer at least partially surrounding the porous alumina support. The hindrance layer functions to pacify the alumina support surface and limits the interaction of the alumina support with the rare earth oxide. In specific embodiments, the hindrance layer hinders ceria from interacting and forming a complex with the alumina support.

As used herein, the term "partial layer" or "partially surround" refers to a deposit or dispersion of rare earth oxide, wherein the deposit/dispersion covers at least 40%, 50%, 60% or more of the underyling layer or the underlying support material.

As used herein, the term "stabilizer" refers to compounds that act to stabilize the high surface area refractory metal oxide or alumina support of a catalytic composition.

As used herein, the term "activated alumina" refers to a high surface area phase of alumina, such as, but not limited to, gamma-alumina. The selection of activated alumina in the catalytic composition provides a high surface area support on which the hindrance layer is dispersed.

As used herein, the term "catalyst carrier" refers to a composite support that carries or supports a specific composition and/or a catalytic species such as a platinum group metal catalyst. The term "support" refers to the underlying high surface area material (e.g., alumina) upon which additional chemical compounds or elements are carried. Thus, a support may comprise alumina particles and a carrier may comprise support particles of alumina having one or more of a hindrance layer and a rare earth oxide layer on the support particles. The term "substrate" refers to the monolithic material onto which the carrier is placed, typically in the form of a washcoat containing a plurality of carriers having catalytic species thereon. A washcoat is formed by preparing a slurry containing a specified solids content (e.g., 30-50% by weight) of carriers in a liquid vehicle, which is then coated onto a substrate and dried to provide a washcoat layer. As used herein, a "catalytic article" refers to a substrate having thereon a plurality of carriers having catalytic species thereon. A catalytic article can include one or more washcoats on a substrate.

In one or more embodiments, the catalyst carrier comprises a porous alumina support having a hindrance layer on and at least partially surrounding the alumina support, the hindrance layer comprising one or more of an oxide, hydroxide, sulfate, or carbonate of barium, strontium, and calcium, the catalyst carrier further including a platinum group metal and a rare earth oxide, wherein the hindrance layer is effective to prevent the rare earth oxide from forming a complex with the alumina support.

The catalyst carrier can be deposited on a substrate to provide a desired amount of catalytic species on the substrate. For example, the catalyst carrier may comprise about 5 to 400 g/ft$^3$, for example 20-150 g/ft$^3$ of a PGM catalytic species.

The catalyst carrier deposited on the substrate is generally formed as a coated layer over most, if not all, of the surfaces of the substrate contacted.

In one or more embodiments, the substrate is a ceramic or metal having a honeycomb structure. Any suitable substrate may be employed, such as a monolithic substrate of the type having fine, parallel gas flow passages extending therethrough from an inlet or an outlet face of the substrate such that passages are open to fluid flow therethrough. The passages, which are essentially straight paths from their fluid inlet to their fluid outlet, are defined by walls on which the catalytic material is coated as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 60 to about 900 or more gas inlet openings (i.e. cells) per square inch of cross section.

The ceramic substrate may be made of any suitable refractory material, e.g. cordierite, cordierite-α-alumina, silicon nitride, zircon mullite, spodumene, alumina-silica-magnesia, zircon silicate, sillimanite, a magnesium silicate, zircon, petalite, α-alumina, an aluminosilicate and the like.

The substrates useful for the catalyst carriers of embodiments of the present invention may also be metallic in nature and be composed of one or more metals or metal alloys. The metallic substrates may be employed in various shapes such as pellets, corrugated sheet or monolithic form. Specific examples of metallic substrates include the heat-resistant, base-metal alloys, especially those in which iron is a substantial or major component. Such alloys may contain one or more of nickel, chromium, and aluminum, and the total of these metals may advantageously comprise at least about 15 wt. % of the alloy, for instance, about 10 to 25 wt. % chromium, about 1 to 8 wt. % of aluminum, and about 0 to 20 wt. % of nickel.

Useful high surface area refractory metal oxides include alumina, titania, zirconia and mixtures of alumina with one or more of titania, zirconia, ceria, baria, and a silicate. In specific embodiments, the refractory metal oxide comprises a porous alumina support. For example, commercially available gamma-alumina can have an average pore radius greater than 50 angstroms and a total pore volume of about 0.4 to greater than 1 $cm^3/g$. Specific porous alumina support materials include large pore alumina, for example having an average pore radius greater than about 100 angstroms and total pore volume of about 0.3 to greater than 0.5 $cm^3/g$. It is generally understood that the pores of the alumina define an inner surface (i.e. inner surface of the pores) as well as a total pore volume.

Exemplary aluminas include large pore boehmite, gamma-alumina, and delta/theta alumina. Useful commercial aluminas used as starting materials in exemplary processes include activated aluminas, such as high bulk density gamma-alumina, low or medium bulk density large pore gamma-alumina, and low bulk density large pore boehmite and gamma-alumina, available from BASF Catalysts LLC (Port Allen, La., USA) and Sasol Germany GmbH (Hamburg, Germany).

Alumina is ubiquitous, as supports and/or catalysts for many heterogeneous catalytic processes. Some catalytic processes occur under conditions of high temperature, high pressure and/or high water vapor pressure. The prolonged exposure to high temperature, typically as much as 1000° C. or higher, combined with a significant amount of oxygen and sometimes steam can result in catalyst deactivation by support sintering. In order to prevent this deactivation phenomenon, a stabilizing metal, such as lanthanum, can be added to the alumina support to stabilize the alumina structure.

Alumina, particularly gamma-alumina, can be stabilized by using a small amount of lanthanum oxide, barium oxide, or a combination thereof, typically below 10%, and in most practices between 1-6 wt. %. In specific embodiments, the alumina is stabilized with an oxide of a metal selected from barium, silicon, zirconium, a rare earth metal, and mixtures thereof. In specific embodiments, the alumina support is stabilized with lanthanum.

In one or more embodiments, the hindrance layer comprises a one or more of a sulfate, carbonate, oxide, or hydroxide of barium, strontium, and calcium and/or mixtures of the same. It is noted that, upon exposure to high temperatures in air, any of the soluble precursors of barium, strontium, and calcium become carbonates, oxides, and/or hydroxides after decomposition. The hindrance layer will be present in an amount of about 3 to about 30 wt. %, based on the weight of the porous alumina support. In one or more embodiments, the hindrance layer comprises a sulfate of barium.

To provide a catalyst carrier with a hindrance layer, the porous alumina support is first impregnated with an aqueous mixture of base metal salt comprising at least one of an acetate, or carbonate, of one or more of barium, strontium, and calcium. The impregnated support may then be treated with a sulfate solution and dried/calcined to provide the catalyst carrier. The impregnated support can be directly subjected to dry/calcine and then optionally exposed to sulfation to provide the catalyst carrier. These steps are also known as thermal fixation. Generally, thermal fixation means that a precursor salt of the desired precious metal in an aqueous solution is loaded onto the desired support, and the support is calcined at high temperatures, e.g., 400° C. or higher. Drying/calcining removes the free moisture and also decomposes the salts to form oxides, hydroxides, sulfates and carbonates. Calcination can be accomplished by any suitable method to obtain a catalyst carrier, including, but not limited to rotary calcining, tray calcining, roller hearth calcining, flash calcining, and vertical calcining. Calcination can also be carried out in a chemically controlled atmosphere, e.g., reducing environment, sulfur containing environment, etc. to obtain a catalyst carrier.

Exemplary methods for providing barium sulfate layers are described in commonly assigned U.S. Pat. App. Pub. No. 2012/0165185, which is hereby incorporated by reference. As described therein, in one method barium sulfate is prepared chemically in situ on the porous support such as alumina by treatment of barium oxide (BaO) and/or barium carbonate ($BaCO_3$) with sulfuric acid ($H_2SO_4$). The barium sulfate layer formed by in situ by treatment of barium oxide and/or barium carbonate with sulfuric acid is chemically bonded to the porous support such as alumina. The barium sulfate formed in situ is generally evenly dispersed on the outer surfaces and within inner surfaces of the porous support. The catalyst carrier including a barium sulfate layer thus chemically formed retains a porous structure, and the barium sulfate layer may not be necessarily continuous throughout the surfaces, but is generally well-dispersed. A catalyst carrier prepared by chemical in situ formation of barium sulfate exhibits improved thermal stability.

In an exemplary process for in situ formation, the starting porous support material can be impregnated with a barium salt solution, such as barium acetate or barium carbonate, or a mixture comprising a barium salt solution to a minimum of about 80% incipient wetness, in order to prepare a BaO and/or $BaCO_3$ porous support. Impregnation of the starting material can be carried by feeding the dried, powdered materials from a drum or bag, and the wet materials as salt solutions to charge a mixer, such as that supplied by a Littleford Mixer available from Littleford Day, Inc., Florence, Ky. Mixing can be conducted for a time sufficient so that a fine uniform mix results. The wet materials (i.e., barium salt solution) can be delivered to the mixer, for instance, via peristaltic pump with a maximum volume flow rate of about 2 L/min via a nozzle producing a conical atomized spray for impregnation/dispersion of the solution onto the porous support material. After stirring to achieve a minimum of about 80% incipient wetness, the impregnated support material can be optionally dried and calcined, to produce a BaO and/or $BaCO_3$ porous support. Optionally, the impregnated support material can be de-lumped, screened, and/or sized before drying/calcination. Calcination can be carried out using a flash calciner, a tray and batch furnace, box oven, or a rotary kiln. In an embodiment, calcination can be carried out using a rotary kiln or a flash calciner. Exemplary temperatures for calcination include from about 400° C. to 750° C. and 400° C. to 600° C. Exemplary durations of calcination include from about 1 second to 2 hours. Generally, spray-drying techniques are excluded, such as using a flash vessel in which hot gases downwardly descend in a helical trajectory and converge into a vortex, for flash drying of droplets, as described in U.S. Pat. No. 5,883,037.

Thermally stable $BaSO_4$/Alumina can be prepared without requiring a calcination step of barium acetate-impregnated material prior to treatment with sulfuric acid. Therefore, in an embodiment, the preparation of the BaO and/or $BaCO_3$ porous support via the in situ process excludes a step of drying and calcining prior to treatment with sulfuric acid to form $BaSO_4$.

The BaO and/or $BaCO_3$ porous support is then treated in situ with at least one molar equivalent of sulfuric acid. Sulfuric acid can be provided in a range up to about 2.0 equivalents, based on barium salt. In an embodiment, sulfuric acid is added in an amount ranging from about 1.5 to 1.9 equivalents, based on barium salt. In an embodiment, sulfuric acid is added in an amount of about 1.7 equivalents, based on barium salt. Alternatively, an excess of sulfuric acid can be used to ensure complete stoichiometric formation of $BaSO_4$ from BaO. In this manner, efficient use of the reagent is employed, while pH in the product is controlled. After treatment with sulfuric acid, the material can be optionally dried and/or calcined at a sufficient temperature and time to remove substantially all free moisture/water and any volatiles formed during the reaction of sulfuric acid and barium acetate. Without wishing to be bound by theory, it is believed calcination can also decompose residual unreacted barium acetate or barium carbonate.

In an embodiment, the porous support is a large pore alumina. Thus, $BaSO_4$ is made via direct acid/base reaction of BaO and/or $BaCO_3$ dispersed on a large pore alumina, such as gamma alumina.

In an embodiment, excess sulfuric acid is used and consumed via reaction with the alumina to form aluminum sulfate, $Al_2(SO_4)_3$, the excess being employed to ensure 100% formation of $BaSO_4$. It should be noted that the by-product aluminum sulfate can potentially act as exchange sites (acidic sites) producing an acidic, low pH support, where BaO/$BaCO_3$-alumina is basic, high pH. This surface chemistry may be important when coupled with one or more platinum group metals (PGM), for example palladium nitrate, processed to thermally fix the precious metal by calcination.

The salt solutions used in preparing the catalyst carrier by in situ chemical formation can be nitrate or acetate solutions. The salts are generally soluble, such that homogeneous salt solutions are employed in the process. Other appropriate aqueous acidic salt solution can be used. The pH of the acidic solution can range from about 1 to about 5.

In another embodiment, barium sulfate is prepared by mechanical fusion. Commonly-assigned U.S. Pat. App. Pub. No. 2010/0189615 describes mechanically-fused components, which is also hereby incorporated by reference. Mechanical fusion involves host and guest particles, i.e., $BaSO_4$ is the guest particle which is fused to the porous support such as alumina via mechanical forces. The mechanofusion-based catalyst carrier is a core and shell arrangement, wherein the porous support is the core and the $BaSO_4$ is the shell. This arrangement is sufficient for enabling the $BaSO_4$ to be in close proximity to the PGM for optimal promoter effect. The thermal stability of the catalyst carrier prepared by mechanical fusion may not be as pronounced as that for the catalyst carrier prepared by in situ chemical formation. However, both methods of production result in catalyst carriers having improved emissions abatement in catalysts, such as TWC catalysts.

In one or more embodiments, the catalyst carrier that comprises a porous alumina support and a hindrance layer can comprise a mixed oxide layer that is coated on the inner surface of the pores of the porous support. In specific embodiments, the catalyst carrier has a bulk density from about 10% to about 50% greater than the density of the porous alumina support, and a total pore volume of about 50% less based on the total pore volume of the porous alumina support. More generally the density of the carrier is greater than the density of the original porous alumina support, and a total pore volume smaller than the total pore volume of the original porous alumina support. The catalyst carrier retains a porous structure, and the mixed oxide hindrance layer is not necessarily continuous throughout the pores, but is generally well-dispersed.

While not wishing to be bound by theory, according to one or more embodiments, upon drying/calcination of the impregnated support, complex base metal oxides can be formed, with or without precious metals, directly in the pores of the alumina support, providing a high density material having smaller pores/pore volume. A mixed oxide hindrance layer is formed by decomposition of useful inorganic metal salts on and in the pores of the porous alumina support. The mixed oxide hindrance layer is thus formed by synthesizing metal oxide within the pores of the porous alumina support.

Base metal oxides can be formed from base metal salt solutions, for example nitrate salts, optionally dissolved in an aqueous acid such as nitric acid; examples include cerium nitrate, lanthanum nitrate, and the like. Other useful salts include acetates, optionally dissolved in an aqueous acid such as acetic acid; zirconium acetate, barium acetate, for example. Useful base metal oxides include, but are not limited to, zirconium oxide, barium oxide, lanthanum oxide, and cerium oxide. These compounds can be used to prepare complex mixed oxide materials using the processes described herein.

Other base metal salts can be used in the present processes to make mixed oxide hindrance layers, for example, nitrate salts, acetate salts, tartrates, carbonates and the like. Acidic aqueous base metal salt solutions are particularly useful. Base metals particularly useful in the present processes include barium, strontium, calcium, and combinations thereof. Barium sulfate salts are used in specific embodiments.

In one or more embodiments, the catalyst carrier comprising a porous alumina support and a hindrance layer further includes a rare earth oxide. The rare earth oxide can form a layer on the less reactive alumina surface and/or at least partially overlying the hindrance layer. In other words, the rare earth oxide is blocked from forming a complex with the reactive alumina surface by the presence of the hindrance layer. The rare earth oxide comprises at least one oxide of a rare earth metal selected from Ce, Pr, Nd, Eu, Sm, Yb, and La. In specific embodiments, the rare earth oxide comprises at least one oxide of a rare earth metal selected from Ce, Pr, and La. In a very specific embodiment, the rare earth oxide comprises an oxide of cerium.

In one or more embodiments, the rare earth oxide is in close proximity to the platinum group metal component. The rare earth oxide comprises cerium oxide and/or lanthanum oxide. Without intending to be bound by theory, it is thought that the presence of ceria can stabilize the platinum group metal on the surface of the catalyst. The ceria suppresses the conversion of the platinum group metal oxide (e.g. palladium oxide, PdO) to platinum group metal (e.g. palladium metal, Pd) and, thus, slows the sintering of the precious metal particles upon prolonged high temperature exposure. Because there is less sintering of precious metal particles on the surface of the catalyst, there is more precious metal surface available to reduce or oxidize the various components of the exhaust gas stream.

Neodymium and/or lanthanum can form a complex or composite with the perovskite structure, thus, can serve a similar function as cerium and suppress the sintering of precious metal. As used herein, the term "perovskite" or "perovskite structure" refers to any material with the same type of crystal structure as calcium titanium oxide ($CaTiO_3$), with the oxygen in the face centers. The general formula for perovskite compounds is $ABX_3$, where "A" and "B" are two cations of very different sizes, and X is an anion that bonds to both. In one or more embodiments, the rare earth oxide can comprise a complex or composite with a perovskite structure of at least one of neodymium and lanthanum complexed with one or more of nickel, iron, manganese, copper, and aluminum.

It has been observed, however, that cerium oxide can chemically interact or bond with alumina supports. When cerium oxide forms a complex with an alumina support, there is less cerium oxide available to stabilize the platinum group metal, which, ultimately, will lead to an undesirable decrease in catalytic activity. Thus, a protective or pacifying layer is needed to prevent this rare earth oxide/alumina complex from forming. The hindrance layer of the present invention, thus, serves to protect the rare earth oxide (e.g. cerium oxide) from interaction with the porous alumina support. Therefore, the hindrance layer allows more of the rare earth oxide to be available to stabilize the platinum group metal and suppress the conversion of the PGM oxide to PGM, leading to an improvement in catalytic performance.

The rare earth oxide can be deposited in a layer surrounding the hindrance layer by first impregnating a soluble solution containing rare earth oxide precursor salts and the drying/calcining to convert to desirable oxide. The calcination can be accomplished by any suitable method to obtain a catalyst carrier, including, but not limited to rotary calcining, tray calcining, roller hearth calcining, flash calcining, and vertical calcining. Additionally, according to one or more embodiments, the rare earth oxide rare earth oxide composition can be co-deposited onto the "passivated" alumina support.

The catalyst carrier according to embodiments of the invention comprising the porous alumina support and hindrance layer described above may further comprise at least one precious metal, such as platinum group metals, dispersed on the carrier. The catalyst carrier will comprise a catalytically effective amount of platinum group metal. The platinum group metals are selected from platinum, palladium, rhodium, ruthenium, iridium, osmium, and mixtures thereof. In general, the platinum group metal will be present in a loading of about 0.5 to as much as 15 wt %.

The catalyst carrier described previously can be loaded with precious metal salts, more particularly, platinum group metal salts, in a similar process to deposit rare earth oxide on the catalyst carrier. The catalyst carrier can be impregnated with a precious metal salt solution, and then the resulting impregnated catalyst carrier is thermally fixed or dried/calcined to remove the free moisture and also decompose the salts to form an active precious metal component. Calcination can be by any suitable method to obtain a catalyst carrier, including, but not limited to rotary calcining, tray calcining, roller hearth calcining, flash calcining, and vertical calcining. Alternatively, the platinum group metal can be chemically fixed with an appropriate acid or base. As used herein, the phrase "in close contact proximity" means that the platinum group metal is next to, on, or close to the rare earth oxide.

In one or more embodiments, the catalyst carriers of the invention comprising the porous alumina support, hindrance layer and a rare earth oxide describe above comprises at least one platinum group metal dispersed and thermally or chemically fixed on the catalyst carrier. In one or more embodiments, the platinum group metal is dispersed and thermally or chemically fixed in close proximity with the rare earth oxide.

In one or more embodiments, the platinum group metal comprises palladium. In general, the palladium will be present in a loading of about 0.5 to as much as 15 wt %.

In one or more embodiments, a palladium catalyst carrier comprises a porous alumina support having a hindrance layer on the alumina support, the hindrance layer comprising one or more of barium oxide (or sulfate or carbonate or hydroxide), strontium oxide (or sulfate or carbonate or hydroxide), and calcium oxide (or sulfate or carbonate or hydroxide), the catalyst carrier optionally further including a rare earth oxide that changes valence state to stabilize palladium oxide and slow the decomposition of palladium oxide into palladium metal, wherein the hindrance layer is effective to prevent the rare earth oxide from forming a complex with the alumina, and wherein the palladium is fixed to the rare earth oxide. In one or more embodiments, the rare earth oxide is cerium. In one or more embodiments, the cerium is complexed with zirconium. In one or more embodiments, the cerium includes other oxide diluents selected from La, Pr, Nd, and Zr, and mixtures thereof.

In one or more embodiments, a platinum group metal catalyst carrier comprises a barium sulfate ($BaSO_4$) and alumina support having a high concentration of platinum group metal dispersed and thermally or chemically fixed to the support. In general, the platinum group metal is present in a loading of at least 6 wt % or higher to stabilize/passivate the support. In a specific embodiment, the platinum group metal is present in a loading of at least 10 wt %. In a further embodiment, the platinum group metal is present in a loading of at least 12 wt %. The catalyst carrier further includes a rare earth oxide that changes valence state to stabilize the platinum group metal oxide and slow decomposition of the platinum group metal oxide into platinum group metal. In one or more embodiments, the platinum group metal comprises palladium. In one or more embodiments, the rare earth oxide comprises cerium oxide, praseodymium oxide, or lanthanum oxide. The palladium oxide is effective to prevent the rare earth oxide from forming a complex with the alumina support.

According to specific embodiments, it may be desirable incorporate an additional amount of oxygen storage component (OSC) to the platinum group metal catalyst carrier to enhance catalyst performance. As used herein, the term "oxygen storage component" (OSC) refers to an entity that has a multi-valence state and can actively react with reductants such as carbon monoxide (CO) or hydrogen under reduction conditions and then react with oxidants such as oxygen or nitrous oxides under oxidative conditions. Examples of suitable oxygen storage components comprise the rare earth oxides, particularly ceria. The OSC can also comprise one or more of lanthana, praseodymia, neodynmia, niobia, europia, samaria, ytterbia, yttria, zirconia, and mixtures thereof in addition to ceria. The additional rare earth oxide may be in bulk (e.g. particulate) form. The oxygen storage component can include cerium oxide (ceria, $CeO_2$) in a form that exhibits oxygen storage properties. The lattice oxygen of ceria can react with carbon monoxide, hydrogen, or hydrocarbons under rich A/F conditions. Upon lean exposure, the reduced ceria has the ability to recapture oxygen from air and/or NOx species, thus promoting conversion of NOx. The rare earth oxides cerium and praseodymium exhibit multiple oxidations states. It is the ability of each of cerium and praseodymium to vary their oxidation states that readily permits them to manipulate oxygen species. Due to a change in the oxidation state from +4 to +3 and vice versa, cerium oxide is capable of supplying oxygen in rich exhaust gas (oxygen deficiency) and of capturing oxygen species in lean exhaust gas (oxygen excess).

For example, ceria in a form that is oxidized to $Ce^{4+}$ under lean exhaust gas conditions wherein an excess amount of oxygen is present in the exhaust stream, and that releases oxygen as it is reduced to the $Ce^{3+}$ oxidation state when rich exhaust gas conditions are present.

Without intending to be bound by theory, the chemical equilibrium reactions that occur are, as illustrated for cerium, as follows:

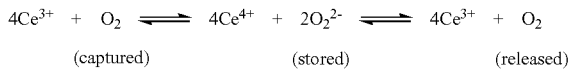

The oxygen released is readily available at the catalyst surface to oxidize carbon monoxide (CO) to carbon dioxide ($CO_2$) according to the following reaction:

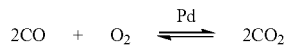

In contrast to cerium and praseodymium components, lanthanum components have available only a +3 oxidation state, and neodymium components also have readily available only a +3 oxidation state. The presence of the single +3 oxidation state available to lanthanum and neodymium in a catalytic composition means that lanthanum components and neodymium components cannot exhibit OSC properties.

In one or more embodiments, the rare earth oxide provides oxygen storage capacity. The rare earth oxide comprises one of cerium oxide and praseodymium oxide that stores and releases oxygen. Without intending to be bound by theory, it is thought that the oxygen storage capacity of ceria stabilizes the platinum group metal on the surface of the catalyst. The ceria suppresses conversion of the platinum group metal oxide (e.g. palladium oxide, PdO) to platinum group metal (e.g. palladium metal, Pd) and, thus, preserves or improves catalytic activity. Because there is more precious metal oxide available on the surface of the catalyst, there is more precious metal oxide available to reduce or oxidize the various components of the exhaust gas stream.

While neodymium and lanthanum are not known for their oxygen storage capacity, when complexed in a perovskite phase, neodymium and lanthanum can serve a similar function as cerium and praseodymium and suppress the conversion of PGM oxides (e.g. palladium oxide) to PGM (e.g. palladium metal). In one or more embodiments, the rare earth oxide comprises at least one of neodymium and lanthanum complexed with one or more of nickel, iron, manganese, copper, and aluminum in a perovskite phase.

The OSC composition comprises an oxygen storage component, for example, in specific embodiments, ceria, and a diluent component, in specific embodiments, zirconia. The OSC composition can comprise ceria as an oxygen storage component in combination with other materials including, for example, lanthanum (La), praseodymium (Pr), neodymium (Nd), niobium (Nb), tantalum (Ta), zirconium (Zr), yttrium (Y), nickel (Ni), manganese (Mn), iron (Fe), copper (Cu), gadolinium (Gd), and combinations thereof comprising at least one of the foregoing metals (which may be in the form of an oxide). These materials are believed to stabilize the cerium component and slow the rapid degradation of ceria upon high temperature exposure. The oxygen storage component is, therefore, stabilized against deactivating when used in high temperature environments (e.g. 550° C. to 1100° C.).

A specific example of an OSC composition comprises a ceria-zirconia composite. The ceria-zirconia composite can additionally contain lanthana, neodymia, praseodymia and yttria. This composition in solid solution can provide synergistic promoting effect. It is advantageous to add the oxygen storage component composition to the catalyst, in specific embodiments, in particulate form.

As used herein, the term "particulate form" refers to discrete particles segregated from the catalyst carrier particles. These particles may be as small as 0.1 to 15 micrometers in diameter or smaller. The oxygen storage component in particulate form mixed with the platinum group metal catalyst carrier particles can provide a catalyst composition with superior performance. "Bulk form" may refer to a component of the catalyst material that is in particulate form, according to one or more embodiments.

In one or more embodiments, a platinum group metal catalyst carrier comprises a barium sulfate ($BaSO_4$) and alumina support having a high concentration of platinum group metal dispersed and thermally or chemically fixed to the support. In general, the platinum group metal is present in a loading of at least 6 wt % or higher to stabilize/passivate the support. In a specific embodiment, the platinum group metal is present in a loading of at least 10 wt %. In a further embodiment, the platinum group metal is present in a loading of at least 12 wt %. The catalyst carrier further includes a rare earth oxide that changes valence state to stabilize the platinum group metal oxide and slow decomposition of the platinum group metal oxide into platinum group metal. In one or more embodiments, the platinum group metal comprises palladium. In one or more embodiments, the rare earth oxide comprises cerium oxide, praseodymium oxide, or lanthanum oxide. The palladium oxide is effective to prevent the rare earth oxide from forming a complex with the alumina support.

It is expected that the catalyst carriers prepared according to the principles described above would be useful in preparing appropriate exhaust gas purification catalytic articles useful in emission treatment or control systems. For example, these exhaust gas purification catalyst carriers could be coated on one or more appropriate substrates in order to treat and/or purify gaseous products discharged from an internal combustion engine. An emissions treatment system or catalytic article for an exhaust gaseous stream can include a catalyst carrier disposed or coated on a ceramic or metallic honeycomb flow-through substrate.

To treat a gaseous exhaust stream of a gasoline engine, the exhaust stream, including hydrocarbons, carbon monoxide, nitrogen oxide, and other gas components, is contacted with the catalytic article of the present invention. The catalytic article can simultaneously catalyze the oxidation of hydrocarbons and/or carbon monoxide and the reduction of nitrogen oxides present in a gaseous exhaust stream.

All references, including publications, patent applications, and patents, cited herein are hereby incorporated by reference for all purposes to the same extent as if each reference were individually and specifically indicated to be incorporated by reference and were set forth in its entirety herein.

The use of the terms "a" and "an" and "the" and similar referents in the context of describing the materials and methods discussed herein (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the materials and methods and does not pose a limitation on the scope unless otherwise claimed. No language in the specification should be construed as indicating any non-claimed element as essential to the practice of the disclosed materials and methods.

The invention is now described with reference to the following examples. Before describing several exemplary embodiments of the invention, it is to be understood that the invention is not limited to the details of construction or process steps set forth in the following description. The invention is capable of other embodiments and of being practiced or being carried out in various ways.

EXAMPLES

Example 1

Preparation of 4% Pd/5% $BaSO_4$/Alumina+10% $CeO_2$

A catalyst carrier support was prepared by supporting 5% barium sulfate on a gamma alumina. The support was dried/calcined to provide the catalyst carrier with a barium hindrance layer. The catalyst carrier was further impregnated with a solution of palladium nitrate to provide 4% Pd by weight and was dried/calcined. The catalyst carrier was impregnated with a solution of cerium nitrate to provide 10% ceria which was dried/calcined to provide the final a catalytic material comprised of highly dispersed PdO sandwiched between the Ba hindrance layer and a cerium oxide layer.

Example 2

Preparation of 4% Pd/5% $BaSO_4$/Alumina+10% $La_2O_3$

A catalyst carrier was prepared by supporting barium sulfate on a gamma alumina support. The impregnated support was dried/calcined to provide the catalyst carrier with a barium hindrance layer. The catalyst carrier was further impregnated with a solution of palladium nitrate and was dried/calcined. Finally, the catalyst carrier was impregnated with a solution of lanthanum nitrate which was dried/calcined to provide the final a catalytic material comprised of highly dispersed PdO sandwiched between the Ba hindrance layer and a Lanthanum oxide layer in the amounts provided above.

Example 3

Preparation of 4% Pd/5% $BaSO_4$/Alumina+10% $ZrO_2$

A catalyst carrier was prepared by supporting barium sulfate on a gamma alumina support. The impregnated support was dried/calcined to provide the catalyst carrier with a barium hindrance layer. The catalyst carrier was further impregnated with a solution of palladium nitrate and was dried/calcined. Finally, the catalyst carrier was impregnated with a solution of Zirconyl acetate which was dried/calcined to provide the final a catalytic material comprised of highly dispersed PdO sandwiched between the Ba hindrance layer and a zirconium oxide layer in the amounts provided above.

Example 4

Preparation of 4% Pd/5% $BaSO_4$/Alumina+10% $Pr_6O_{11}$

A catalyst carrier was prepared by supporting barium sulfate on a gamma alumina support. The impregnated support was dried/calcined to provide the catalyst carrier with a barium hindrance layer. The catalyst carrier was further impregnated with a solution of palladium nitrate and was dried/calcined. Finally, the catalyst carrier was impregnated with a solution of praseodymium nitrate which was dried/calcined to provide the final a catalytic material comprised of highly dispersed PdO sandwiched between the Ba hindrance layer and a praseodymium oxide layer in the amounts provided above.

Example 5

Conversion of PdO to Pd

The catalyst carriers of Examples 1-4 were analyzed for their conversion of palladium oxide to palladium metal. All samples were aged at 1100° C. for 3 hours in air. It is noted that both the catalyst carrier containing lanthanum oxide and the catalyst carrier containing praseodymium oxide contained perovskite phases. Table 1 shows the results.

TABLE 1

| Example # and Description | PdO:Pd | PdO Crystallite Size, Å (±10% relative) | Pd Crystallite Size, Å (±10% relative) |
|---|---|---|---|
| No rare earth oxide treatment | 60:40 | 87 | 317 |
| (1) 4% Pd/5% $BaSO_4$/Alumina + 10% $CeO_2$ | 91:9 | 116 | 303 |
| (2) 4% Pd/5% $BaSO_4$/Alumina + 10% $La_2O_3$ | 63:37 | 71 | 298 |
| (3) 4% Pd/5% $BaSO_4$/Alumina + 10% $ZrO_2$ | 61:39 | 72 | 300 |

TABLE 1-continued

| Example # and Description | PdO:Pd | PdO Crystallite Size, Å (±10% relative) | Pd Crystallite Size, Å (±10% relative) |
|---|---|---|---|
| (4) 4% Pd/5% BaSO$_4$/Alumina + 10% Pr$_6$O$_{11}$ | 59:41 | 75 | 302 |

The results show that the catalyst carrier containing cerium oxide (Example 1) beneficially suppresses the conversion of palladium oxide (PdO) to palladium metal.

Example 6

Effects of Hindrance Layer

A catalyst carrier comprising barium sulfate (BaSO$_4$) and alumina (4 wt % BaSO$_4$) was impregnated with palladium. The palladium was thermally fixed to the BaSO$_4$/alumina carrier. The final catalyst carrier was compared to a catalyst carrier comprising standard alumina (i.e. without a barium sulfate hindrance layer). Hydrocarbon conversion post aging at 1070° C. was compared. Table 2 illustrates the results.

TABLE 2

| Carrier Description | Hydrocarbon Emissions (g/km) |
|---|---|
| Standard Alumina | 0.128 |
| BaSO$_4$/Alumina, w/o Pd | 0.118 |
| BaSO$_4$/Alumina w/Pd thermally fixed | 0.105 |

The results indicate that the effects of a barium sulfate hindrance layer and thermal fixation of palladium are synergistic.

Example 7

Barium Sulfate Optimization

Catalyst carriers comprising varying amounts of barium sulfate were evaluated for effects on hydrocarbon emissions. Hydrocarbon conversion post aging at 1070° C. was compared. Table 3 illustrates the results.

TABLE 3

| Carrier Description | Hydrocarbon Emissions (g/km) |
|---|---|
| Standard Alumina | 0.225 |
| 5% BaSO$_4$/Alumina | 0.205 |
| 7.5% BaSO4/Alumina | 0.215 |
| 10.0% BaSO$_4$/Alumina | 0.235 |

The results indicate that higher amounts of barium sulfate hurt hydrocarbon performance post aging at 1070° C.; the optimum level of barium sulfate for the hindrance layer is ≤5 wt %, preferably between about 3 wt % to about 5 wt %.

Example 8

Three-Way Performance Improvement

The catalyst carriers of Examples 1-4 were disposed on a ceramic or metallic honeycomb flow-through substrate to form three-way catalysts. The TWCs were placed in the exhaust gas stream of a vehicle, and the catalytic activity (reduction of NOx, oxidation of CO and HC) versus the catalytic activity of a catalyst carrier comprising a standard alumina without a hindrance layer was compared. Table 4 illustrates the results. The % improvement is over a standard alumina catalyst carrier.

TABLE 4

| Example # | % Improvement for NOx | % Improvement for CO | % Improvement for HC |
|---|---|---|---|
| (1) 4% Pd/5% BaSO$_4$ + 10% CeO$_2$ | 7.5 | 6.0 | 9.0 |
| (2) 4% Pd/5% BaSO$_4$ + 10% La$_2$O$_3$ | 19.0 | 9.5 | 7.0 |
| (3) 4% Pd/5% BaSO$_4$ + 10% ZrO$_2$ | −9.5 | −2.5 | −2.0 |
| (4) 4% Pd/5% BaSO$_4$ + 10% Pr$_6$O$_{11}$ | −4.5 | 1.0 | 1.5 |

The results indicate that the three-way catalysts containing a catalyst carrier comprising a porous alumina support, a barium hindrance layer, a rare earth oxide selected from cerium oxide or lanthanum oxide, and palladium oxide (Examples 1 and 2) show the greatest improvement versus a standard Pd/alumina carrier without any BaSO$_4$ hindrance layer and/or rare earth oxide.

Example 9

Preparation of 6 Wt % Pd+15 Wt % CeO$_2$

A catalyst carrier was prepared by impregnating a BaSO$_4$/alumina support with a solution of palladium nitrate. The impregnated support was dried/calcined to provide the catalyst carrier with a palladium hindrance layer. The catalyst carrier was further impregnated with a solution of cerium nitrate, which was dried/calcined to provide the final a catalytic material comprised of highly dispersed 6 wt % PdO sandwiched between the BaSO$_4$/alumina support and a 15 wt % cerium oxide layer. The cerium oxide changes valence state to stabilize the palladium oxide and slow decomposition of the palladium oxide (PdO) into palladium (Pd). The palladium hindrance layer serves to prevent the complexation of cerium with the BaSO$_4$/alumina support.

Example 10

Conversion of PdO to Pd

The catalyst carrier of Example 9 was analyzed for its conversion of palladium oxide to palladium metal. The samples were aged at 1100° C. for 4 hours in air. Table 5 shows the results.

TABLE 5

| Example # and Description | PdO Crystallite Size, Å (±10% relative) | Pd Crystallite Size, Å (±10% relative) |
|---|---|---|
| (9) BaSO$_4$/alumina + 15% CeO$_2$/6% Pd (prior to aging) | 45 | — |
| 6% Pd/GAL-130 (prior to aging) | 41 | — |
| BaSO$_4$/alumina + 6% Pd (prior to aging) | 37 | — |
| (9) BaSO$_4$/alumina + | 106 | — |

TABLE 5-continued

| Example # and Description | PdO Crystallite Size, Å (±10% relative) | Pd Crystallite Size, Å (±10% relative) |
|---|---|---|
| 15% CeO₂/6% Pd (aged at 1100° C.) | | |
| 6% Pd/GAL-130 (aged at 1100° C.) | 119 | 265 |
| BaSO₄/alumina + 6% Pd (aged at 1100° C.) | 124 | 279 |

The catalyst carrier of Example 9 shows the smallest PdO crystallite size upon aging, and the sample contains no Pd$^0$.

Example 11

Preparation of Pd+15 Wt % CeO$_2$ Doped Ba/La/Al

A catalyst carrier was prepared by supporting barium sulfate on a commercially available lanthana/alumina (in the range of 3-10 wt. % lanthana) support. The impregnated support was dried/calcined to provide the catalyst carrier with a barium hindrance layer. The catalyst carrier was further impregnated with a solution of cerium nitrate and was dried/calcined. Finally, the catalyst carrier was impregnated with a solution of palladium nitrate which was dried/calcined to provide the final a catalytic material comprised of palladium on a 15% cerium doped barium-lanthana alumina.

Example 12

Effects of Barium Hindrance Layer on Hydrocarbon Emissions

The catalyst carrier of Example 11 was compared to catalyst carriers comprising: (i) Pd on 15% CeO$_2$ doped lanthana/alumina, and (ii) Pd and 15% CeO$_2$ dispersed together on lanthana/alumina. Hydrocarbon conversion post L/R aging at 1000° C. for 12 hours was compared. Table 6 illustrates the results.

TABLE 6

| Carrier Description | Hydrocarbon Emissions (g/L cat) at 2000 sec |
|---|---|
| Pd + 15% CeO₂ on La/Al | 3.0 |
| (Pd + 15% CeO₂) on La/Al | 2.925 |
| Pd + 15% CeO₂ on Ba/La/Al | 2.65 |

The results indicate that the carrier of Example 11 (where the Pd was dispersed on a 15% CeO$_2$ doped Ba/La/Al showed the best hydrocarbon conversions after lean/rich aging.

Example 13

Effects of Barium Hindrance Layer on Carbon Monoxide Emissions

The catalyst carrier of Example 11 was compared to catalyst carriers comprising: (i) Pd on 15% CeO$_2$ doped lanthana/alumina, and (ii) Pd and 15% CeO$_2$ dispersed together on lanthana/alumina. Carbon monoxide (CO) conversion post L/R aging at 1000° C. for 12 hours was compared. Table 7 illustrates the results.

TABLE 7

| Example # and Carrier Description | CO Emissions (g/L cat) at 2000 sec |
|---|---|
| (i) Pd + 15% CeO₂ on La/Al | 9.75 |
| (ii) (Pd + 15% CeO₂) on La/Al | 10.5 |
| (11) Pd + 15% CeO2 on Ba/La/Al | 9.1 |

The results indicate that the carrier of Example 11 (where the Pd was dispersed on a 15% CeO$_2$ doped Ba/La/Al showed the best carbon monoxide conversions after lean/rich aging.

Example 14

Preparation of Pd+7 Wt % CeO$_2$ Doped Ba/La/Al

A catalyst carrier was prepared by supporting barium sulfate on a commercially available lanthana/alumina support (about 3-8 wt. % lanthana). The impregnated support was dried/calcined to provide the catalyst carrier with a barium hindrance layer. The catalyst carrier was further impregnated with a solution of cerium nitrate and was dried/calcined. Finally, the catalyst carrier was impregnated with a solution of palladium nitrate which was dried/calcined to provide the final a catalytic material comprised of palladium on a 7% cerium doped barium-lanthana alumina.

Example 15

Preparation of Pd+15 Wt % CeO$_2$ Doped Zr/La/Al

A catalyst carrier was prepared by supporting about 15 wt. % zirconium sulfate on a commercially available lanthana/alumina support (about 3-8 wt. % lanthana). The impregnated support was dried/calcined to provide the catalyst carrier with a zirconium hindrance layer. The catalyst carrier was further impregnated with a solution of cerium nitrate and was dried/calcined. Finally, the catalyst carrier was impregnated with a solution of palladium nitrate which was dried/calcined to provide the final a catalytic material comprised of palladium on a 15% cerium doped zirconium-lanthana alumina (about 15 wt. % zirconium, about 3-8 wt. % lanthana, balance alumina).

Example 16

Effects of Barium Hindrance Layer on Carbon Monoxide Emissions

The catalyst carriers of Examples 11, 14, and 15 were compared. Carbon monoxide conversion post L/R aging at 1000° C. for 12 hours was compared. Table 8 illustrates the results.

TABLE 8

| Example # and Carrier Description | CO Emissions (g/L cat) after 2000 sec |
|---|---|
| (Reference) Pd + 7% Nd on Ba/La/Al | 12.0 |
| (14) Pd + 7% CeO₂ on Ba/La/Al | 8.25 |
| (11) Pd + 15% CeO₂ on Ba/La/Al | 7.0 |
| (15) Pd + 15% CeO₂ on Zr/La/Al | 7.25 |

The results indicate significant (~40%) CO improvement with both Pd+15% CeO$_2$ doped Zr/La/Al and Pd+15% CeO$_2$ doped Ba/La/Al, when compared to the reference.

Example 17

Effects of Barium Hindrance Layer on Hydrocarbon Emissions

The catalyst carriers of Examples 11, 14, and 15 were compared. Hydrocarbon conversion post L/R aging at 1000° C. for 12 hours was compared. Table 9 illustrates the results.

TABLE 9

| Carrier Description | Hydrocarbon Emissions (g/L cat) after 2000 sec |
|---|---|
| (Reference) Pd + 7% Nd on Ba/La/Al | 3.70 |
| (14) Pd + 7% CeO$_2$ on Ba/La/Al | 3.40 |
| (11) Pd + 15% CeO$_2$ on Ba/La/Al | 3.20 |
| (15) Pd + 15% CeO$_2$ on Zr/La/Al | 3.30 |

The results indicate the CeO$_2$ doping promoted hydrocarbon conversion. There was a >10% hydrocarbon reduction with Pd+15% CeO$_2$ on Ba/La/Al compared to the reference Pd+7% Nd on Ba/La/Al.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as disclosed. Thus, it is intended that the present invention include modifications and variations that are within the scope of the appended claims and their equivalents.

What is claimed is:

1. A catalyst material comprising a catalyst carrier including a porous alumina support having a hindrance layer on the alumina support, the hindrance layer comprising one or more of barium sulfate, strontium sulfate, zirconium sulfate, and calcium sulfate, the catalyst carrier further including a rare earth oxide and palladium oxide fixed in close proximity to the rare earth oxide, wherein the hindrance layer is effective to prevent the rare earth oxide from forming a complex with the alumina support.

2. The catalyst material of claim 1, wherein the rare earth oxide changes valence state to stabilize the palladium oxide and slow decomposition of palladium oxide into palladium metal.

3. The catalyst material of claim 1, wherein the rare earth oxide is selected from an oxide of Ce, Pr, La, and mixtures thereof.

4. The catalyst material of claim 1, wherein the rare earth oxide comprises cerium oxide.

5. The catalyst material of claim 1, wherein the rare earth oxide comprises an oxide of lanthanum complexed with one or more of nickel, iron, manganese, copper, and aluminum in a perovskite phase.

6. The catalyst material of claim 1, further comprising an additional oxygen storage catalyst in particulate form.

7. The catalyst material of claim 6, wherein the additional oxygen storage component comprises ceria.

8. The catalyst material of claim 7, wherein the oxygen storage component further comprises at least one oxide selected from zirconium, yttrium, lanthanum, praseodymium, neodymium, europium, samarium, ytterbium and mixtures thereof.

9. The catalyst material of claim 8, wherein the cerium oxide is complexed with a mixture of neodymium, praseodymium, and zirconium.

10. A catalyst material comprising a catalyst carrier including a porous support including barium sulfate and alumina, a hindrance layer on the support, the hindrance layer comprising a platinum group metal oxide, the catalyst carrier further including a rare earth oxide that changes valence state to stabilize the platinum group metal oxide and slow decomposition of the platinum group metal oxide into platinum group metal, wherein the hindrance layer is effective to prevent the rare earth oxide from forming a complex with the support, and wherein the platinum group metal oxide is fixed in close contact with the rare earth oxide.

11. The catalyst material of claim 10, wherein the platinum group metal is palladium.

12. The catalyst material of claim 10, wherein the rare earth oxide is selected from an oxide of Ce, Pr, and La.

13. The catalyst material of claim 10, wherein the rare earth oxide comprises cerium oxide.

14. The catalyst material of claim 10, wherein the rare earth oxide comprises an oxide of neodymium or lanthanum complexed with one or more of nickel, iron, manganese, copper, and aluminum in a perovskite phase.

15. The catalyst material of claim 14, wherein the rare earth oxide comprises an oxide of lanthum complexed with manganese.

* * * * *